United States Patent [19]

Hibyan et al.

[11] Patent Number: 4,568,246

[45] Date of Patent: Feb. 4, 1986

[54] FIBER REINFORCED/EPOXY MATRIX COMPOSITE HELICOPTER ROTOR TORQUE TUBE

[75] Inventors: Edward S. Hibyan, Trumbull; George J. Wehnert, Madison; Thomas J. Toner, Milford, all of Conn.; Francis E. Byrnes, Jr., White Plains, N.Y.; Peter C. Ogle, Woodbridge, Conn.

[73] Assignee: United Technologies Corporation, Hartford, Conn.

[21] Appl. No.: 477,709

[22] Filed: Mar. 22, 1983

[51] Int. Cl.$^4$ .............................................. B64C 27/38
[52] U.S. Cl. ................................ 416/134 A; 416/230; 416/141
[58] Field of Search ............... 416/134 A, 138 A, 141, 416/230 A, 244 R, 246, 248

[56] References Cited

U.S. PATENT DOCUMENTS 3,669,566  6/1972  Bourquardez et al. .... 416/140 A X
4,222,709  9/1980  Mouille ........................... 416/141 X
4,273,511  6/1981  Mouille et al. ............. 416/138 A X
4,345,876  8/1982  Schwarz et al. ................ 416/134 A
4,381,902  5/1983  Head et al. ...................... 416/134 A
4,427,340  1/1984  Metzger et al. ...................... 416/141
4,432,696  2/1984  Stephan et al. ................. 416/141 X Primary Examiner—Everette A. Powell, Jr.
Attorney, Agent, or Firm—Alan C. Cohen

[57] ABSTRACT

A composite torque tube for a helicopter rotor hub is described. The torque tube contains upper and lower load bearing surfaces connected by two sidewall portions. Both the sidewall and load bearing portions contain filament wound glass fiber reinforced epoxy resin such fibers having a ±45° orientation. The upper and lower load bearing portions additionally contain a plurality of multiaxially oriented plies of continuous unidirectionally oriented graphite fibers interleaved with the glass fibers so as to produce a torque tube with crack resistance, damage tolerance, light weight, strength and integrity inspectability.

1 Claim, 2 Drawing Figures

FIBER REINFORCED/EPOXY MATRIX COMPOSITE HELICOPTER ROTOR TORQUE TUBE

CROSS REFERENCE TO RELATED APPLICATIONS

Attention is directed to the following copending, commonly assigned U.S. patent applications, filed on even date herewith: Ser. No. 477,696 filed in the names of Peter C. Ogle, George J. Wehnert, Francis E. Byrnes, Jr. and entitled "A Fiber Reinforced/Epoxy Matrix Composite Helicopter Rotor Main Hub Plate; Ser. No. 477,701 filed in the names of Peter C. Ogle, Edward S. Hibyan and Thomas J. Toner and entitled "Fiber Reinforced/Epoxy Matrix Composite Helicopter Rotor Yoke"; and Ser. No. 477,708 filed in the names of Peter C. Ogle, George J. Wehnert, Thomas J. Toner, Francis E. Byrnes, Jr. and Edward S. Hibyan and entitled "Composite Helicopter Rotor Hub".

DESCRIPTION

1. Technical Field

The field of art to which this invention pertains is helicopter rotor components and particularly helicopter rotor torque tubes.

2. Background Art

Historically, helicopter main rotor hubs have been made of high strength, lightweight, critical metals or alloys. Although these metal components have performed adequately, there are a number of drawbacks inherent to these materials. Three important areas where these materials possess less than optimum features are weight, availability and fail-safeness.

Weight has always been a consideration in helicopter construction and with increasing fuel costs it has become a primary objective, i.e. to reduce the weight of the overall helicopter by using lighter materials. At present aluminum and titanium are used extensively because of their light weight and strength, however, there is a constant search for lighter and stronger materials. In addition, these lightweight metals are classified as "critical" materials with their primary availability being through importation. As has been demonstrated by the oil embargoes of past years, reliance on foreign sources for these materials is not desirable. Furthermore, these metals do not impart a damage tolerance to their components That is, when a metal component starts to weaken, through fatigue or otherwise, cracks are generated. These cracks continue to grow quickly as there is nothing to stop their propagation and the component part can fail completely. As can be appreciated, this lack of damage tolerance can be disastrous in a helicopter.

In order to overcome the shortcomings of such metal components, the industry has taken two approaches. One is to build a redundant component so that should one fail the other will allow for a safe landing. The second is to overdesign the particular part such that it would have much greater strength than would normally be required under normal circumstances. Both of these approaches add weight to the aircraft as well as increased cost and reliance on critical metals.

Recently, composite materials have been used as replacement parts for many metal components due to their light weight and relatively low cost. For example, composite materials are now being used in main structural components such as main rotor blades and tail rotor assemblies on helicopters. However, it is not always practical to replace a metal component with a composite material due to particular design considerations and shortcomings in the composite physical properties.

Composite rotor hubs have been designed using a laminated structure of fiber reinforced resin e.g. note British Pat. No. 2,092,541. Such hubs are of such complicated design as to make them costly to fabricate, and having fewer component parts, produce an increased number of failure points.

Accordingly, what is needed in this art are damage tolerant, relatively inexpensive and light weight composite components capable of withstanding the forces developed in a helicopter rotor hub assembly.

DISCLOSURE OF THE INVENTION

The present invention is directed to helicopter rotor hub composite torque tubes. The torque tube is made up of layers of graphite fibers and glass fibers laid up and interleaved in an epoxy resin matrix in specific manner. The glass fibers are present in the torque tube continuously filament wound and oriented substantially in a ±45° orientation. The upper and lower main load bearing portions also contain, interleaved with the continuous glass fibers, continuous fiber graphite packs made up of a plurality of plies of graphite fibers in a 0° and ±45° orientation. The amount of graphite fibers in the 0° orientation should not exceed 50% of the total fibers in the torque tube. Selection of such materials oriented in the specified manner results in a torque tube with crack resistance, damage tolerance, integrity inspectability, light weight, high strength, without the need for redundant parts or over-designed components.

BEST MODE FOR CARRYING OUT THE INVENTION

Figure 1:
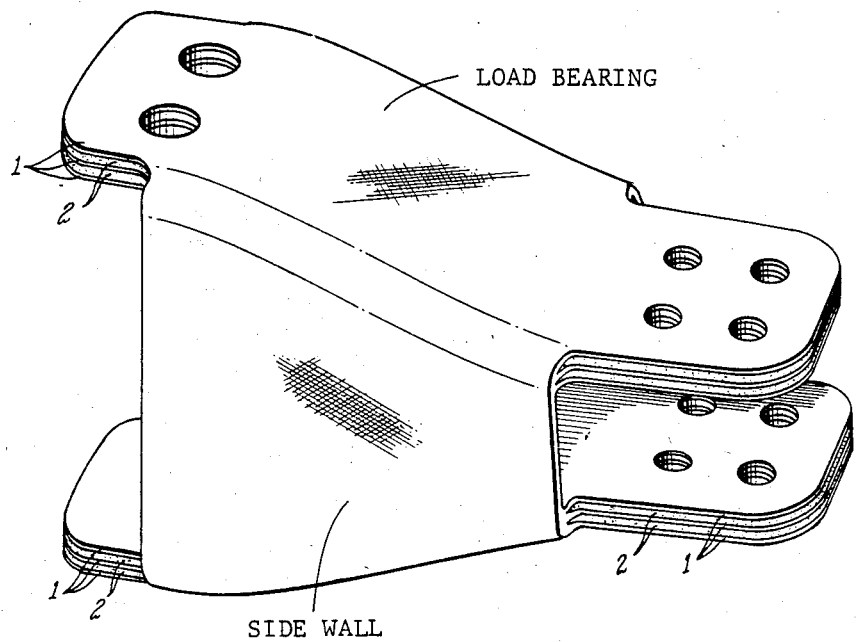
FIG. 1 shows a composite torque tube according to the present invention.

As the graphite fiber reinforcement, high strength graphite fiber may be used which has a minimum filament modulus of $30 \times 10^6$ psi. These filaments may be purchased preimpregnated with an epoxy resin in the form of a multifilament collimated graphite tape in sheet form from Narmco Materials Inc., Costa Mesa, Calif. These tapes range anywhere from about 1 to about 18 inches wide and are typically used with a width of about 12 inches. In this sheet form each sheet or ply of the graphite fiber bundles is about 0.012 inch in thickness, although sheets with 0.006 inch thicknesses are also available. The cured graphite/resin composite should contain about 50% to about 65% fibers by volume and a unidirectional cured layer should have a tensile modulus of about $17 \times 10^6$ to about $20 \times 10^6$ psi at room temperature. The individual fibers are generally about 0.35 to about 0.399 mil in diameter.

While any glass fiber material with the requisite physical properties can be used, the preferred glass fiber is an S-type which can also be obtained preimpregnated with epoxy resin from Narmco Materials Inc. The cured glass fiber/resin layer should have about 45% to about 60% fiber content by volume and a tensile strength of about 125,000 psi minimum as well as a longitudinal tensile modulus of about $5.1 \times 10^6$ to about $6.3 \times 10^6$ psi both measured at room temperature. As with the graphite fibers, the preimpregnated glass fibers are available in fiber bundle tows anywhere from 1/10 inch to 1 inch in width and about 0.0125 inch in thickness. Such tows cure out to a thickness of about 0.010 inch and are typically used in ⅛ inch widths.

The epoxy resin matrix should be selected so as to be compatible with the fiber reinforcement. It is also desirable that the epoxy resin be satisfactorily curable at low pressures i.e. about 20 to about 100 psig. Three such resin systems are available commercially, two from U.S. Polymeric designated as Resin Number 773 and Resin Number E7K8, and the other from Narmco Materials Inc. designated as Resin Number 5225. While the graphite and glass fibers can be laid up and subequently treated with the epoxy resin either by brushing or otherwise applying a coating composition of suitable carrier of the epoxy resin or resin coated just prior to laying up, the fibers are preferably laid up as commercially purchased, i.e. preimpregnated with the epoxy resin.

The torque tube is formed by filament winding on a mandrel preferably in the shape of two torque tubes with their larger cross-sectional areas face to face. This allows filament winding of the two tubes at once, which are then separated by cutting before (or after) curing. Initially, the glass fiber filament is wound on the mandrel in a +45° angle on the first pass and a −45° angle on the return pass. This angle can vary as much as ±10°, but is preferably ±5° to ±7°. As stated above, the glass fiber bundle tow is approximately ⅛ inch in width and 0.0125 inch thick, curable to a thickness of 0.010 inch.

While any number of passes can be made on the mandrel, the number of passes is determined by the sidewall and overall thickness desired which in turn is based on the overall strength and stiffness desired in the torque tube. This in turn is determined by the particular rotor system the component is being designed for. Typically the stiffness in the torque tube is designed to duplicate the stiffness of the metal parts being replaced, for example, the spindle cuff, etc.

After the first layer of glass fiber is applied, the first pack of graphite fibers is laid up. The in-plane orientation of the graphite fiber is such that approximately 40% to 50% of the graphite fiber based on total fiber content of the torque tube is in the 0° orientation. Taking into account the already laid-up glass fibers, the graphite plies are laid up in the 0°, ±45° orientation. The graphite fiber packs are comprised of multiaxially oriented multiple plies of unidirectionally oriented graphite fibers. That is to say that the graphite fibers in any one ply are continuous and unidirectionally oriented but the plies are stacked one atop the other in 0°, ±45° orientation. Following the laying up of the graphite plies or packs of plies, the glass fibers are again filament wound as in the initial laying. Following this filament winding, graphite packs are again layed up as in the initial graphite pack laying. And finally, glass fiber filament winding is repeated as in the winding of the first two glass fiber lay-ups. If desired, as a back-up redundancy (or crack-stopper), additional layers of glass fiber (in tape form) can be interleaved between the plies or packs of graphite fibers as they are being laid up, the number and locations of the glass fiber layers being dictated by the projection of particular loads to be applied. A typical thickness of fiber lay ups is 0.05 inch thick for each of the first two glass fiber filament windings and 0.06 inch thick for the last glass fiber filament winding (this is cured out thickness) with the graphite packs each representing a thickness of about 0.2 inch.

The thus formed torque tubes are then conventionally autoclave cured and appropriate bolt hole attachments provided. A conventional vacuum bag can be used during curing to assist in holding the torque tube component parts in place.

As with the yoke typically epoxy resin systems are used which cure at about 340° F. to about 360° F., at pressures of about 60 psig to about 100 psig, in about 2 to about 4 hours. In this instance, the entire assembly is placed in an autoclave and heated to approximately 350° F. at approximately 80 psig for approximately 2 hours to compress the assembly and cure the epoxy resin. The result is a torque tube requiring only drilling of the attachment holes, and local machining at each end.

The torque tube damage tolerant features are three fold. First, the main load carrying members of the graphite are interleaved with the unidirectional fiberglass which provides crack resistance. Second, both the upper and lower load packs are separated by one of the three wraps of ±45° fiberglass which also surround the packs both inside and outside. This results in both redundant load paths and crack growth prevention from one pack to another. Third, the upper and lower packs are a combination of unidirectional and ±45° graphite and fiberglass. Should damage occur to the cross ply fiberglass torque box the upper and lower main structural packs are structurally sufficient to transmit the pitch load. The above redundant/damage tolerant features apply both in the main body of the torque tube and in the bolt hole attachment areas at either end.

Figure 2:
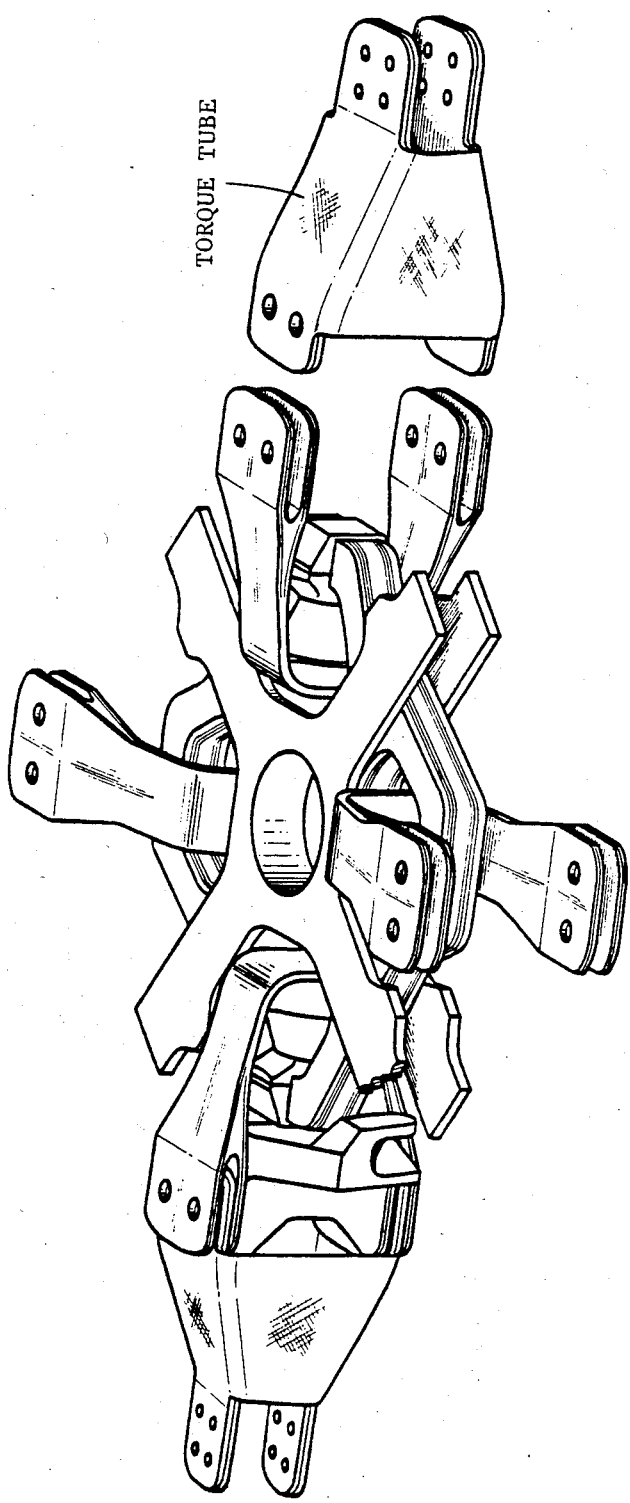
FIG. 2 shows a composite rotor hub assembly containing a composite torque tube according to the present invention.

In FIG. 1 a torque tube according to the present invention is shown with the glass fiber windings shown as 1 and the graphite packs as 2. In FIG. 2 showing a composite rotor hub assembly, the torque tubes according to the present invention are shown as indicated. As can be seen from the Figures, the torque tube has primarily a box shaped cross-section of decreasing cross-sectional area i.e. tapered, with rounded edges. Each end terminates with a set of attachment flanges and the torque tube is aerodynamically (smooth) shaped with low drag.

The torque tube of the present invention has many advantages over the existing metal hubs used. The first and foremost is the damage tolerant features which are built into the torque tube which are in addition to the safe life (overall part life) design. The composite torque tube weight projection will result in significant weight savings in addition to being stronger than existing systems. The number of parts will also be reduced. Materials and manufacturing costs should be lower than with existing systems and due to the simpler design and greater accessability it will be easier to replace parts. The inherent damage tolerance of the composite torque tube will extend the useful life of the hub and improve the repairability which will also reduce the operational costs.

Although this invention has been shown and described with respect to detailed embodiments thereof, it will be understood by those skilled in the art that various changes in form and detail thereof may be made without departing from the spirit and scope of the claimed invention.

We claim:

1. A helicopter hub torque tube comprising a graphite and glass fiber reinforced epoxy resin matrix composite having upper and lower main load bearing portions connected by two sidewall portions, the sidewall and load bearing portions comprising an epoxy resin matrix reinforce with approximately ±45° oriented continuous filament wound glass fibers, the load bearing portions comprising a plurality of multiaxially oriented plies of unidirectionally oriented continuous graphite fibers interleaved with the filament wound glass fibers thus forming a torque tube which is crack resistant, damage tolerant and integrity inspectable.

* * * * *